US007350695B2

United States Patent
Piccirillo et al.

(10) Patent No.: US 7,350,695 B2
(45) Date of Patent: Apr. 1, 2008

(54) METHOD, SYSTEM, AND COMPUTER PROGRAM PRODUCT FOR IMPLEMENTING PIN-BASED DATA TRANSFER ACTIVITIES

(75) Inventors: James S. Piccirillo, Middletown, CT (US); Jeffrey Thibeault, Branford, CT (US); Justin Holmes, Old Saybrook, CT (US); Leonard V. Samela, Westport, CT (US); Wayne J. Hooper, Clinton, CT (US)

(73) Assignee: Greenwald Industries, Incorporated, Chester, CT (US)

( * ) Notice: Subject to any disclaimer, the term of this patent is extended or adjusted under 35 U.S.C. 154(b) by 301 days.

(21) Appl. No.: 11/157,222

(22) Filed: Jun. 21, 2005

(65) Prior Publication Data

US 2006/0283936 A1 Dec. 21, 2006

(51) Int. Cl.
*H04L 9/00* (2006.01)
*G06F 17/00* (2006.01)
(52) U.S. Cl. .................................. 235/375; 713/184
(58) Field of Classification Search ............... 235/375; 705/72; 713/184
See application file for complete search history.

(56) References Cited

U.S. PATENT DOCUMENTS

| 4,965,568 | A | * | 10/1990 | Atalla et al. ............... 340/5.85 |
| 5,361,062 | A | * | 11/1994 | Weiss et al. ............... 340/5.26 |
| 5,892,827 | A | * | 4/1999 | Beach et al. ................. 705/76 |
| 2005/0080677 | A1 | * | 4/2005 | Foss, Jr. ...................... 705/16 |

* cited by examiner

Primary Examiner—Jamara A. Franklin
(74) Attorney, Agent, or Firm—Cantor Colburn LLP

(57) ABSTRACT

A system for implementing personal identification number (PIN)-based data transfer activities includes a host system and a PIN generator application and encryption engine executing on the host system. The PIN generator application and the encryption engine generate an instance of a PIN by the PIN generator application in response to a request by a holder of an instrument to create the PIN. Generation of the instance of the PIN includes receiving an instrument identifier and a data value from the holder of the instrument, retrieving a transfer system key and a seed value associated with the instrument from an account record associated with the instrument identifier, and encrypting the instrument identifier, the data value, the transfer system key, and the seed value to form the instance of the PIN. The instance of the PIN is provided to the holder of the instrument. The data value is encoded on the instrument.

20 Claims, 4 Drawing Sheets

METHOD, SYSTEM, AND COMPUTER PROGRAM PRODUCT FOR IMPLEMENTING PIN-BASED DATA TRANSFER ACTIVITIES

BACKGROUND

The present invention relates generally to data processing systems, and more particularly, to a method, system, and computer program product for implementing PIN-based data transfer activities.

Card transaction systems (CTSs), or data transfer systems, are used in a variety of applications whereby value is added to cards (referred to herein as vending cards) for use in vending systems and/or services. For example, a Laundromat may utilize a CTS or data transfer system whereby a consumer presents cash to the CTS. The CTS takes the cash and the vending card and adds the value of the cash to the vending card. The vending card may then be utilized at the washers and dryers at the Laundromat, which are activated in response thereto. Alternatively, transaction systems may be employed that dispense tokens rather than adding value to a vending card. Other CTSs may employ a credit/debit option in which an individual enters credit/debit card information into the CTS, which then connects to a payment processing server or financial institution over a secure network link. The credit/debit card is not to be confused with the vending card through which the vending services are employed. The CTS initiates authorization to access the individual's credit/debit account and, if approved, the value requested is added to the vending card and the credit/debit card balance is modified to reflect the transaction.

While these credit/debit-related CTSs provide a useful service, the potential for wide spread utility of these systems is often outweighed by the expenses incurred in their operation. In particular, the systems and communications technologies used in conducting these network-based authorizations for applying value to the vending cards can be quite cost prohibitive. What is needed, therefore, is a low-cost alternative to existing data transfer systems.

SUMMARY

In accordance with exemplary embodiments, a method, system, and computer program product for implementing PIN-based data transfer activities is provided.

The system includes a means for generating an instance of a PIN using elements including an identifier for an instrument and the data to be transferred. The system also includes a transfer system including a reader for identifying the instrument, an input means for receiving the PIN, and an encoder. The system also includes a processor executing instructions for validating the PIN. The transfer system encodes the instrument with the data to be transferred in response to successful validation of the PIN.

A method for implementing PIN-based data transfer activities includes generating an instance of a PIN via a PIN generator using elements including an identifier for an instrument and the data to be transferred. The method also includes identifying the instrument by a transfer system. The method also includes validating the PIN by a processor executing on at least one of the transfer system and the instrument. In response to successful validation of the PIN, the method includes encoding the instrument with the value by the transfer system.

A computer program product for implementing PIN-based data transfer activities includes instructions for implementing a method. The method includes generating an instance of a PIN via a PIN generator using elements including an identifier for an instrument, and the data to be transferred. The method also includes identifying the instrument by a transfer system. The method also includes validating the PIN by a processor executing on at least one of the transfer system and the instrument. In response to successful validation of the PIN, the method includes encoding the instrument with the value by the transfer system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF EXEMPLARY EMBODIMENTS

The PIN-based data transfer activities of the invention provide a low-cost alternative to the network-based data transfer systems. The PIN-based data transfer system provides a central location for generating PINs. Each PIN is generated from the data to be transferred and an instrument identifier, among other elements, which are input into an encryption engine. The PIN may then be presented to a transfer system along with the instrument. The transfer system then decrypts the PIN and transfers the data to the instrument. Because the data is encrypted into the PIN, the transfer system is not required to connect to a secure network and conduct authorization activities, thereby reducing the costs involved in performing data transfer activities. A PIN, as described herein, refers to an encrypted string of data (e.g., alphabetic, numeric, alphanumeric text, etc.) that is valid for a single use, that is, each PIN represents a single instance, in that it becomes void immediately after use. As described herein, a PIN, or personal identification number, refers to a combination of data elements that are encrypted and decrypted for use in implementing data transfer activities.

Figure 1:
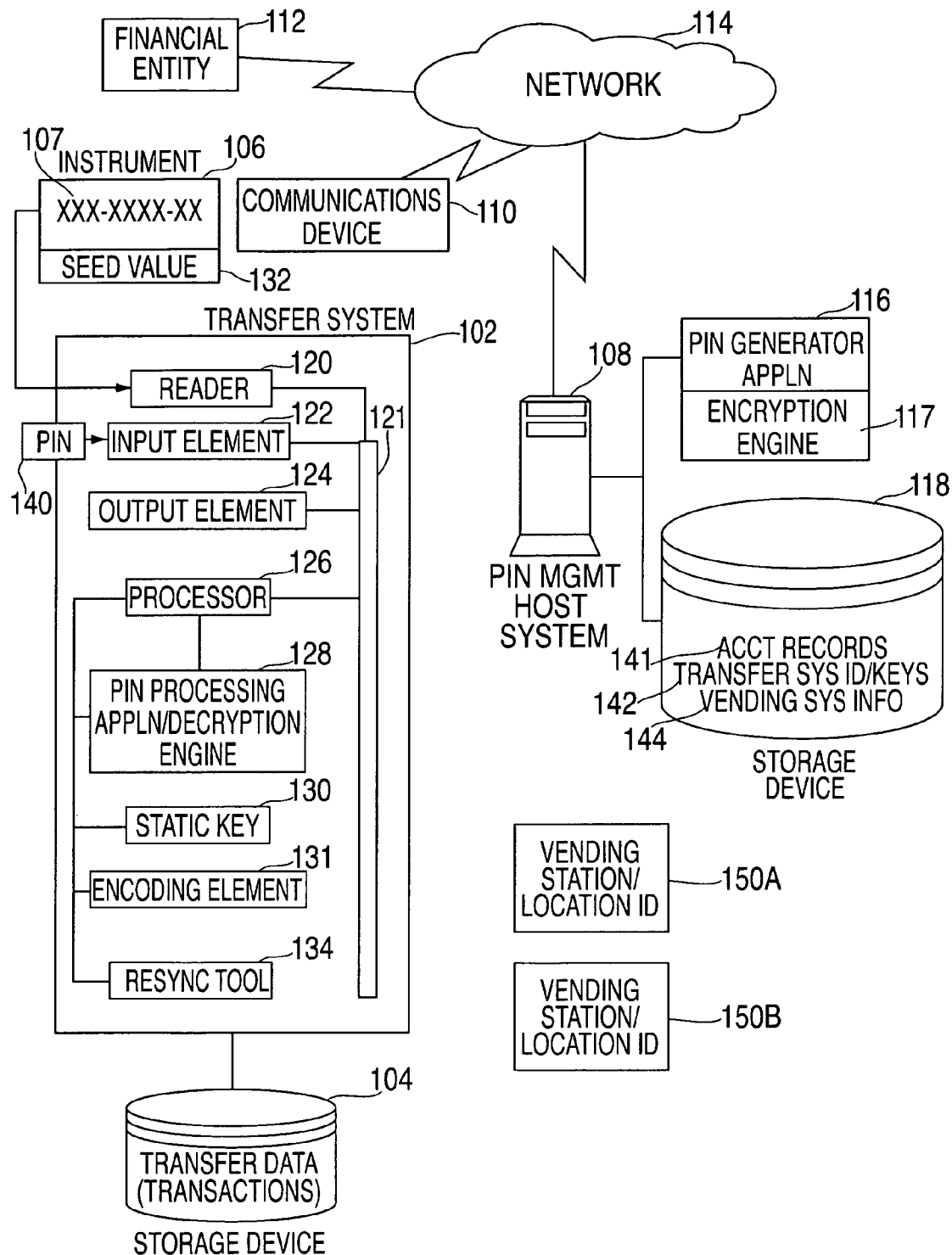
FIG. 1 is a block diagram illustrating a system upon which the PIN-based data transfer activities may be implemented in exemplary embodiments.

Referring now to FIG. 1, a block diagram of a system upon which the PIN-based data transfer activities may be implemented in accordance with exemplary embodiments will now be described. The system of FIG. 1 includes a transfer system 102. Transfer system 102 processes PINs generated by a PIN management host system 108 and executes data transfer activities as described further herein. Transfer system 102 includes various elements including a reader 120 for reading an instrument 106 supplied by an instrument bearer. The instrument 106 may comprise any material or substance capable of receiving and storing encoded information, e.g., a plastic card such as a smart card or other suitable item. The instrument 106 includes an identifier 107 such as an account number, person's name, or other type of identifying indicia. This identifier 107 may be formed on the instrument as raised lettering or alphanumeric text, by magnetic encoding, or other suitable means. Instrument 106 also includes a seed value 132. The seed value 132 is used in the encryption/decryption processes described herein and may be encoded on the instrument 106. The reader 120 identifies the instrument 106 by reading the identifier 107 from the instrument 106. In alternative exemplary embodiments, the instrument 106 includes a processor. The processor may be used to perform the decryption processes otherwise provided by the decryption engine described below.

Other elements of the transfer system 102 include input and output elements, 122 and 124, respectively. Input element 122 is used to receive PINs generated by the PIN management host system 108. For example, input element 122 may be an alphanumeric keypad, interactive voice system or display, etc. As shown in the system of FIG. 1, input element 122 receives PIN 140 via transfer system 102. Output element 124 may be a display, monitor, interactive voice system, or other suitable means for communicating with a user of the transfer system 102. Output element 124, for example, may provide prompts to users of the transfer system 102 to enter information via input element 122.

Transfer system 102 also includes a processor 126 which executes instructions for implementing the PIN processing and data transfer activities described herein. In accordance with an exemplary embodiment, processor 126 executes an application (i.e., PIN processing application) and decryption engine, collectively referenced as 128. The processor 126, input/output elements 122-124, and reader 120 may communicate with each other via a communications bus 121 which is included in the transfer system 102.

Transfer system 102 further includes a static key 130, which is used to decrypt PINs as described further herein. The transfer system 102 further includes an encoding element 131 which may be implemented by the processor 126. The encoding element 131 enables the transfer system 102 to encode seed values (e.g., seed value 132) on instruments, as well as encode the data to be transferred onto instruments as will be described further herein. The processor 126 may also execute a re-synchronization tool 134 for reconciling system errors that may occur during implementation of the PIN processing and data transfer activities. The re-synchronization tool 134 is also described further herein.

Transfer system 102 is in communication with a storage device 104 that stores transactional data relating to the data transfer activities. Storage device 104 stores data transfer transactions conducted via the PIN processing application 128. While transfer system 102 and storage device 104 are shown as separate physical components for ease of explanation, it will be understood that transfer system 102 and storage device 104 may comprise a single system whereby transfer system 102 is provided with internal memory for storing the data and information associated with storage device 104.

The system of FIG. 1 further includes vending stations 150A-150B. Vending stations 150A-150B refer to physical devices or locations that provide vending services to individuals. For example, a vending station may comprise a food or beverage vending machine; washer/dryer machines at a Laundromat, hotel, or apartment complex; a vehicle parking garage, lot, or area; a location to which restricted access is implemented; a health club; business services such as document reproducing machines; tanning salon; and entertainment facilities or devices such as gaming machines (e.g., video games, gambling machines, pinball machines, etc.) and jukeboxes, to name a few. Further, vending stations 150A-150B may comprise any point of sale (POS) system or device configured to process the data stored on the instrument 106. Vending stations 150A-150B receive instruments (e.g., instrument 106) and provide products and/or services to individuals or perform a particular function based on the data provided. The data encoded on the instrument 106 is processed at a vending station commensurate with the value of a product/service provided or the function performed.

A transfer system, such as system 102, is responsible for the data transfer activities associated with one or more vending stations. For example, transfer system 102 may be located in an apartment complex and configured to serve the data transfer activities for vending station 150A which may be a laundry room, and for vending station 150B which may be an access control reader to a secure facility. While only two vending stations 150A-150B are shown in the system of FIG. 1, it will be understood that any number of vending stations may be serviced by transfer system 102. Likewise, while only a single transfer system 102 is shown in the system of FIG. 1, it will be understood that any number of transfer systems 102 may be implemented in performing the PIN-based data transfer activities described herein.

As indicated above, the system of FIG. 1 further includes a PIN management host system 108. The PIN management host system 108 generates PINs that are embedded with data elements for use in implementing data transfer activities. The PIN management host system 108 may be a multi-processor device (e.g., a high-powered PC, mainframe, or server). The PIN management host system 108 executes an application for generating PINs as described herein. This application is referred to herein as a PIN generator application 116.

The PIN management host system 108 also implements an encryption engine 117 that receives data elements provided via the PIN management host system 108 for use in the encryption processes. The number of data bits that can be encoded into the PIN may be determined using the function $\lfloor \log_2(10^\delta - 1) \rfloor$, where $\delta$ is the desired PIN length. The encryption algorithm may use any suitable standard, e.g., AES, DES, RC-4.

The PIN management host system 108 is in communication with a storage device 118. Storage device 118 stores account records 141 and one or more databases of transfer system identifiers and keys 142, and vending station identifiers 144. Account records 141 may be created and stored for each instrument serviced by the PIN management host system 108. Further, each account record 141 may be accessed via an instrument identifier 107 corresponding with an instrument 106. In addition to the instrument identifiers, each account record 141 may include a transfer system identifier corresponding with the particular transfer system that provides data transfer activities with respect to the instrument. Likewise, the account records 141 may store the vending station identifier(s) associated with the transfer system servicing the instrument. Each account record 141 also stores a seed value associated with the instrument (e.g., seed value 132 for instrument 106).

As indicated above, the storage device 118 stores transfer system identifiers/keys 142 and vending station identifiers 144. Transfer system identifiers 142 uniquely identify each transfer system (e.g., 102) that is serviced by the PIN management host system 108. Further, each transfer system utilizes a key (e.g., static key 130 of transfer system 102) for which the PIN management host system 108 keeps a record. Likewise, vending station identifiers 144 uniquely identify each vending station (e.g., vending station 150A and 150B) serviced by the PIN management host system 108, as well as the respective transfer system.

While the storage device 118 is shown directly linked to the PIN management host system 108, it will be understood that storage device 118 may be in communication with the PIN management host system 108 via one or more networks (e.g., network 114). Alternatively, storage device 118 and the PIN management host system 108 may comprise a single device whereby the PIN management host system includes sufficient internal memory for storing the information otherwise associated with the storage device 118.

The PIN management host system 108 is in communication with a network 114. Network 114 may comprise a global network (e.g., Internet), a wide area network (WAN), local area network (LAN), or a combination of the above. Further, communications transpiring over network 114 may occur via any suitable communications technology including wireless and wireline elements.

Also included in the system of FIG. 1 are financial entity 112 and communications device 110, each of which may communicate with the PIN management host system 108 via network 114. Financial entity 112 refers to an entity that serves as a monetary resource for individuals (e.g., a bank, credit union, credit provider, etc.) whereby individuals seek monetary resources through, e.g., an account provided by the financial entity 112. Communications device 110 provides a means for contacting the PIN management host system 108 to request generation of a PIN, request assistance with data transfer issues, and other information. For example, communications device 110 may be a telephone, cell phone, personal digital assistant, computer, or other suitable device. If the communications device 110 is a telephone, the network 114 may comprise a standard POTS (plain old telephone system) network. If communications device 110 is a computer, then network 114 may comprise a TCP/IP-based network. These, and other network configurations, are contemplated by the data transfer activities and system described herein.

Figure 2:
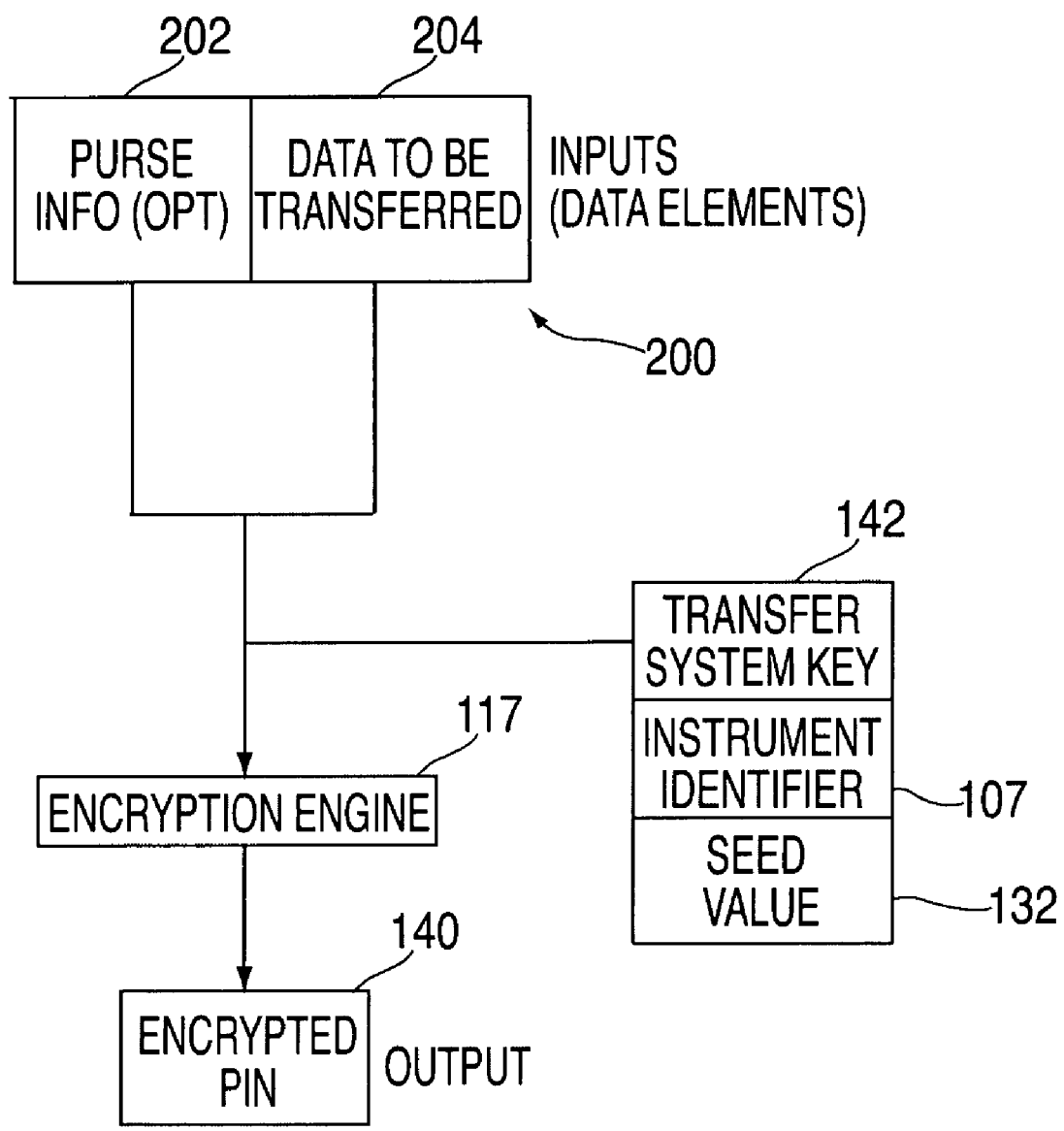
FIG. 2 is a high-level diagram of the PIN generation process used in conducting the data transfer activities in exemplary embodiments.

As indicated above, a PIN is generated via the PIN management host system 108. A high level view of the PIN generation process will now be described in FIG. 2. As shown in FIG. 2, various data elements 200 are used in the PIN generation process. These data elements 200 include the instrument identifier 107 and the data to be transferred 204. In alternative exemplary embodiments, purse information 202 may also be used in the PIN generation process. Purse information 202 refers to an identification of a particular location on the instrument to which data will be transferred. For example, if instrument 106 is configured for use at both vending stations 150A-150B, the data transferred to the instrument 106 may be applied to the purse associated with the vending station 150A or to the location on the instrument to allow access to the secure door at station 150B.

The instrument identifier 107, and optionally the purse information 202, are provided by a holder of the instrument 106 who is requesting the PIN via communications device 110. The data to be transferred 204 may be provided by the holder of the instrument 106. In the case where the data to be transferred represents a value, the data to be transferred 204 is associated with an account of the instrument holder with respect to financial entity 112 (e.g., a checking account at the financial entity 112). In the case where the data to be transferred represents an access to a secure facility, the data to be transferred is associated with privileges that grant access to the facility. The data to be transferred 204 undergoes an authorization process as described further herein.

The account record 141 stores the transfer system identifier and key 142. This key is provided to the encryption engine 117. The encryption engine 117 is initialized with the seed value 132 of the instrument 106 for which the PIN is requested, and is retrieved from a respective account record 141 in storage device 118. The encryption engine 117 is also initialized with the instrument identifier 107 of the instrument 106.

These data elements 200 are input to the encryption engine 117 via the PIN generator application 116 at the PIN management host system 108. Using an algorithm, the encryption engine 117 processes the data elements 200 and creates a PIN 140. The encryption algorithm may generate a cyclic redundancy check. Once the PIN 140 has been generated, the seed value 132 stored in the account record 141 is modified or otherwise processed (e.g., incremented) such that the next PIN to be generated will use a difference seed value. This new seed value is stored in the account record 141 and is associated with the instrument 106.

Figure 3:
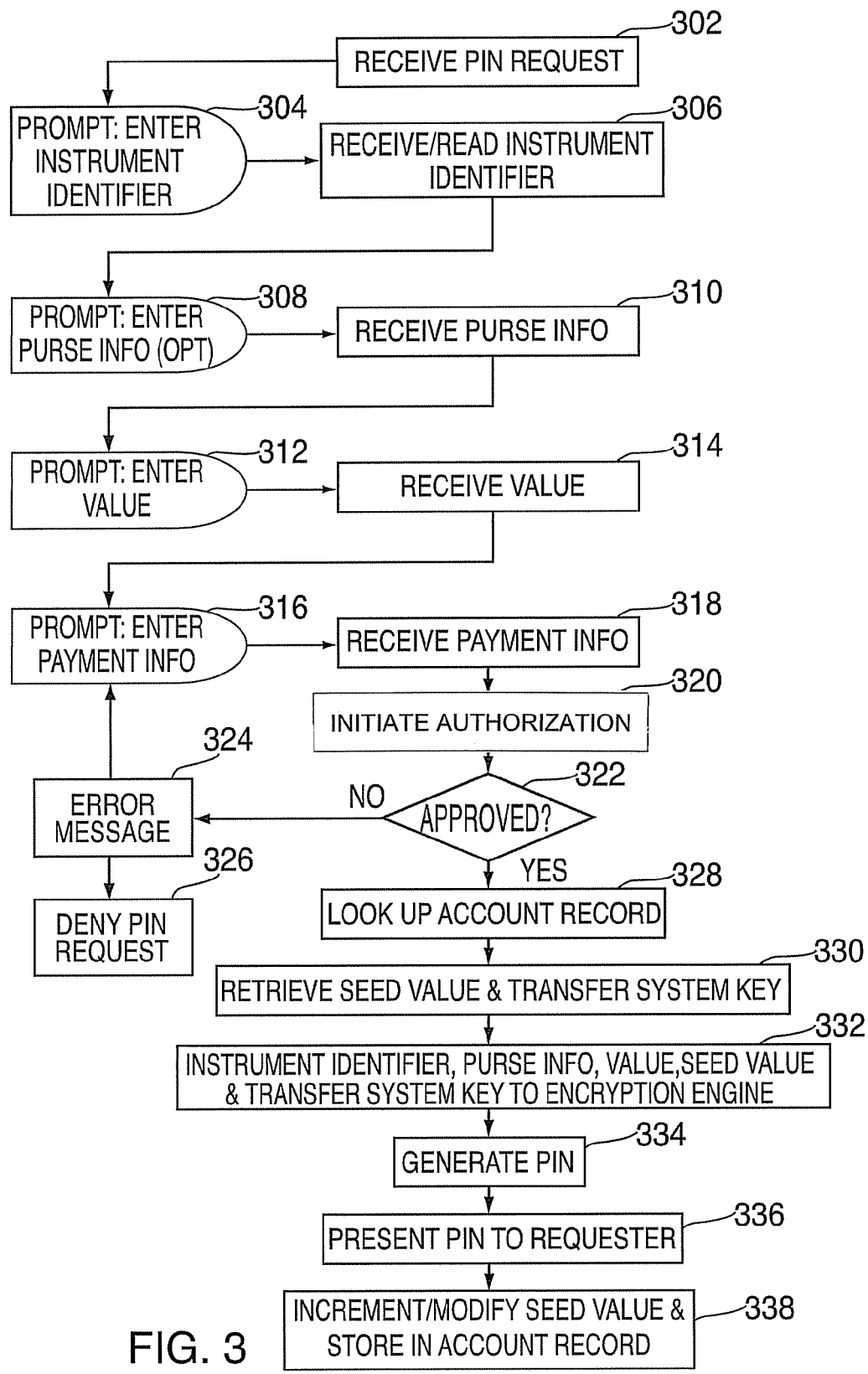
FIG. 3 is a flow diagram illustrating the PIN generation process in greater detail in accordance with exemplary embodiments.

As indicated above, a request for PIN generation may be implemented between communications device 110 and the PIN management host system 108 via network 114. The PIN generation processes will now be described in greater detail with regard to the flow diagram of FIG. 3 in accordance with exemplary embodiments.

The PIN generator application 116 receives a request for a PIN via communications device 110 and network 114 at step 302. The PIN generator application 116 prompts the requester to enter the instrument identifier 107 at step 304. This may be entered using manual keypad input, interactive voice recognition technology, push button screen display, or other suitable means, in accordance with the type of communications device used. At step 306, the PIN generator application receives the instrument identifier 107.

The PIN generator application 116 then prompts the requester to enter purse information 202 at step 308, if purse information is required. As described above, the purse information provided by the requester may be an identification of the particular location to which value will be added with respect to the instrument 106. This purse information 202 is optional. At step 310, the PIN generator application 116 receives the purse information and prompts the user to enter a value 204 at step 312. At step 314, the PIN generator application 116 receives the value 204 and prompts the requester to enter payment information (e.g., account information) at step 316. The requester's account information may include, e.g., a bank or financial entity, account number, expiration date (if a debit or credit card), etc. At step 318, the PIN generator application 116 receives the payment information. In alternative embodiments, this payment information may be stored in the user's account record 141 such that the PIN generator application 116 automatically retrieves the payment information without any further action on the part of the user.

At step 320, the PIN management host system 108 initiates an authorization request with the financial entity 112 identified by the requester. The authorization request seeks permission to debit the requester's account held at the financial entity 112 (or credit if applicable) for the value 204 specified. This request may be implemented using any suitable means of payment processing. If the authorization request is not approved at step 322, an error message may be generated at step 324 and provided to the requester at communications device 110. The content of the error message may vary with the nature of the account access denial. For example, if the payment information was entered incorrectly, the error message may include instructions for re-entering the payment information and the process returns to step 316. If, for example, the nature of the error is insufficient funds in the account, then the error message may include a statement denying the request for PIN at step 326.

If, on the other hand, the authorization is approved at step 322, the PIN generator application 116 accesses storage device 118 searches for the account record 141 relating to the instrument identifier 107 and retrieves information for the instrument 106 associated with the PIN request at step 328. As described above, each transfer system may include a unique static key (e.g., static key 130 for transfer system 102) for which the PIN management host system 108 holds the same key. These keys are used in the encryption/decryption processes described further herein. The PIN generator application 116 looks up the seed value for the instrument 106 as well as the key relating to the transfer system at step 330. The PIN generator application 116 has all of the data elements it needs to generate the PIN (i.e., instrument identifier 107, purse information 202, data to be transferred 204, transfer system key 142, and seed value 132).

These data elements are fed to the encryption engine 117 which processes the data elements and generates a PIN at step 334, which contains embedded therein, the data elements 200 described above. Once created, the PIN is presented to the requester at step 336. At step 338, the seed value 132 is modified as described above in FIG. 2 and stored in account record 141.

The newly generated PIN represents a single PIN instance; in other words, the PIN may be used for a single application (i.e., in initiating a request to add value to a particular instrument). Once the PIN is implemented in the conduct of data transfer activities, the PIN is spent and cannot be used again with that instrument 106. The individual would then need to request a new PIN.

Figure 4:
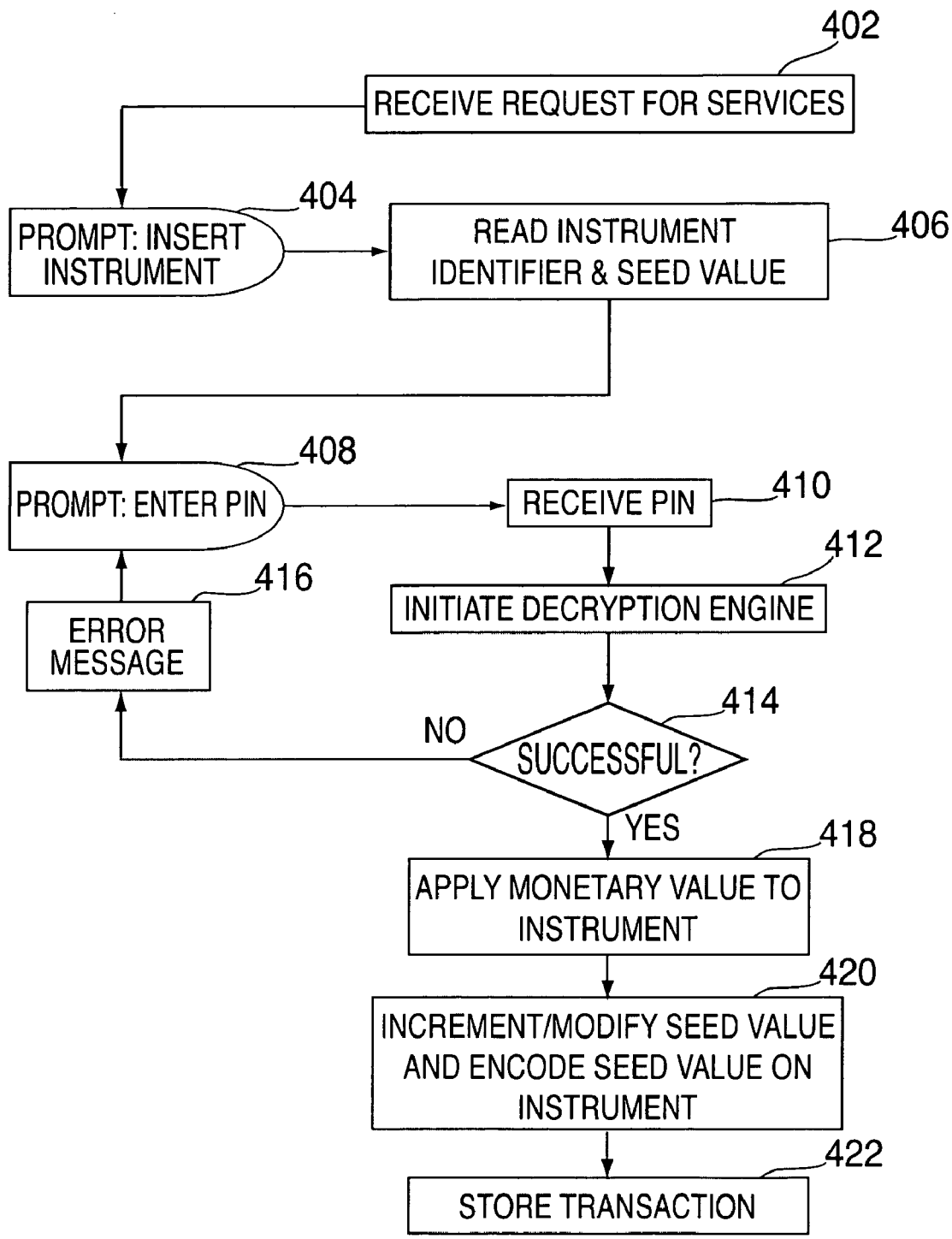
FIG. 4 is a flow diagram illustrating a process for executing data transfer activities for the PIN described in FIGS. 2 and 3 in accordance with exemplary embodiments.

Turning now to FIG. 4, a process for implementing the data transfer activities for a newly generated PIN will now be described in accordance with exemplary embodiments. For purposes of illustration, the holder of the newly generated PIN initiates a request for data transfer at the transfer system 102 in order to utilize one or both of the vending stations 150A and 150B. The individual initiates a request for data transfer at step 402. This request may be initiated by an option provided on the transfer system (not shown), such as a "start" button or display prompt. Alternatively, the request may be initiated by simply entering the instrument 106 into the reader 120 of transfer system 102. In either event, the individual is prompted to insert the instrument 106 at step 404. The reader 120 reads the instrument identifier 107 and seed value 132 at step 406 and provides this information to the PIN processing application 128. The PIN processing application 128, in turn, prompts the individual to enter the PIN that was generated as described in FIG. 3 at step 408. The individual enters the PIN via the input element 122 which is received by the PIN processing application 128 at step 410.

The decryption engine of the PIN processing application 128 is initiated at step 412. The decryption process includes accessing the static key 130 and processing the PIN in order to ascertain the data elements embedded therein. If a cyclic redundancy check has been generated during the encryption process, the decryption engine may validate this cyclic redundancy check at this time. As indicated above, the instrument 106 may include a processor for performing some or all of the decryption processes described herein.

In the case where the decryption process is not successful at step 414, such as in the case where the seed value used by the decryption engine differs from the seed value used in the encryption process, an error message is generated at step 416 and presented to the individual via output element 124. The message may include instructions prompting the individual to re-enter the PIN whereby the process returns to step 408.

If the decryption process is successful at step 414, the data to be transferred 204 that is ascertained from the decryption process is applied to the instrument 106 via, e.g., encoding the instrument with the data to be transferred 204 utilizing the encoding element 131 at step 418. At step 420, the seed value 132 of the instrument 106 is modified in the same manner described above in step 338 of FIG. 3 and in FIG. 2. The results of the decryption process may be stored in a transaction file in storage device 104 at step 422. This transaction file may be useful in tracking the processing of PINs in the event, e.g., that an individual attempts to re-use a PIN or has encountered an error in processing.

In accordance with exemplary embodiments, if the decryption process is unsuccessful at step 414, the re-synchronization tool 134 may be initiated. The re-synchronization tool 134 generates a PIN for an instrument in a similar manner as that described above with respect to the PIN generator application 116, however, the input data elements 200 for the re-synchronization tool 134 are the seed value 132, the unique key 142, and the previous data transfer value for the instrument 106. The initialization elements are the instrument identifier 107 and a secret key known to all transfer systems 102 and the host system 108. This process generates a PIN that encodes the seed value 132 stored on the instrument 106. The host system 108 decrypts the PIN in a similar manner as that described above with respect to the transfer system 102. The resultant seed value is stored in storage device 118 such that the seed value matches the seed value 132 that is stored on the instrument.

As described above, the PIN-based data transfer activities of the invention provide a low-cost alternative to the network-based data transfer systems. A central location is used for generating PINs. Each PIN is encrypted with the data to be transferred and optionally a purse identifier, among other elements. The transfer system decrypts the PIN and transfers the data to the instrument. Because the data to be transferred is encrypted into the PIN, the transfer system is not required to connect to a secure network and conduct authorization activities, thereby reducing the costs involved in performing data transfer activities.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for implementing personal identification number (PIN)-based data transfer activities, comprising:
   a host system; and
   a PIN generator application and encryption engine executing on the host system, the PIN generator application and the encryption engine implementing a method, comprising:
   generating an instance of a PIN by the PIN generator application in response to a request by a holder of an instrument to create the PIN, the PIN used in transferring a data value to the instrument, the data value including at least one of a value of products or services, and a function to be performed via the instrument, the generating comprising:
   receiving an instrument identifier and the data value from the holder of the instrument;
   retrieving a transfer system key and a seed value associated with the instrument from an account record associated with the instrument identifier; and
   encrypting the instrument identifier, the data value, the transfer system key, and the seed value to form the instance of the PIN; and
   providing the instance of the PIN to the holder of the instrument;
   wherein the data value is encoded on the instrument in response to: providing the instrument to a transfer system associated with the transfer system key; providing the PIN to the transfer system by the holder of the instrument; decrypting the PIN; and validating the instrument identifier, the transfer system key, and the seed value.

2. The system of claim 1, wherein the PIN generator application further performs:

generating a new seed value for the instrument upon completing generation of the instance of the PIN; and updating the new seed value in the account record for use in generating another PIN in response to another request to generate a PIN.

3. The system of claim 1, wherein the transfer system is communicatively decoupled from the host system.

4. The system of claim 1, wherein generating the instance of a PIN further comprises:
   receiving purse information from the holder of the instrument, the purse information including an identification of a location on the instrument to which the data value will be transferred; and encrypting the purse information along with the instrument identifier, the data value, the transfer system key, and the seed value to form the instance of the PIN.

5. The system of claim 1, wherein the PIN generator application further performs:
   re-synchronizing the seed value used by the transfer system and the PIN generator application when the seed value used in the encrypting differs from a seed value retrieved by the transfer system.

6. The system of claim 1, wherein generating the instance of a PIN further includes obtaining authorization to debit or charge an account for the amount of a value, used as the data value to be transferred to the instrument, prior to generating the PIN.

7. The system of claim 1, wherein the data value encoded on the instrument is used for receiving goods or services from a vending station or providing access to a secure physical location, the vending station including at least one of:
   a beverage vending machine;
   a food vending machine;
   a document reproduction machine;
   a clothes washing machine;
   a clothes-drying machine;
   a vehicle parking meter;
   a jukebox;
   a gaming device;
   a tanning station;
   a point of sale (POS); and,
   a security access system.

8. The system of claim 7, wherein the account record stores vending system identifiers for vending stations associated with the transfer system that services the instrument.

9. A method for implementing personal identification number (PIN)-based data transfer activities, comprising:
   generating an instance of a PIN by a PIN generator in response to a request by a holder of an instrument to create the PIN, the PIN used in transferring a data value to the instrument, the data value including at least one of a value of products or services, and a function to be performed via the instrument, the generating comprising:
   receiving an instrument identifier and the data value from the holder of the instrument;
   retrieving a transfer system key and a seed value associated with the instrument from an account record associated with the instrument identifier; and
   encrypting the instrument identifier, the data value, the transfer system key, and the seed value to form the instance of the PIN; and
   providing the instance of the PIN to the holder of the instrument;
   wherein the data value is encoded on the instrument in response to: providing the instrument to a transfer system associated with the transfer system key; providing the PIN to the transfer system by the holder of the instrument; decrypting the PIN; and validating the instrument identifier, the transfer system key, and the seed value.

10. The method of claim 9, wherein the transfer system is communicatively decoupled from the PIN generator.

11. The method of claim 9, further comprising:
generating a new seed value for the instrument upon completing generation of the instance of the PIN; and
updating the new seed value in the account record for use in generating another PIN in response to another request to generate a PIN.

12. The method of claim 9, wherein generating the instance of a PIN further comprises:
receiving purse information from the holder of the instrument, the purse information including an identification of a location on the instrument to which the data value will be transferred;
and encrypting the purse information along with the instrument identifier, the data value, the transfer system key, and the seed value to form the instance of the PIN.

13. The method of claim 9, further comprising re-synchronizing the seed value used by the transfer system and the PIN generator when the seed value used in the encrypting differs from a seed value retrieved by the transfer system.

14. The method of claim 9, wherein generating the instance of a PIN further includes obtaining authorization to debit or charge an account for the amount of a value, used as the data value to be transferred to the instrument, prior to generating the PIN.

15. A computer program product for implementing personal identification number (PIN)-based data transfer activities, the computer program product including instructions for causing a computer to implement a method, comprising:
generating an instance of a PIN by a PIN generator in response to a request by a holder of an instrument to create the PIN, the PIN used in transferring a data value to the instrument, the data value including at least one of a value of products or services, and a function to be performed via the instrument, the generating comprising:
receiving an instrument identifier and the data value from a holder of the instrument;
retrieving a transfer system key and a seed value associated with the instrument from an account record associated with the instrument identifier; and
encrypting the instrument identifier, the data value, the transfer system key, and the seed value to form the instance of the PIN; and
providing the instance of the PIN to the holder of the instrument;
wherein the data value is encoded on the instrument in response to: providing the instrument to a transfer system associated with the transfer system key; providing the PIN to the transfer system by the holder of the instrument; decrypting the PIN; and validating the instrument identifier, the transfer system key, and the seed value.

16. The computer program product of claim 15, wherein the transfer system is communicatively decoupled from the PIN generator.

17. The computer program product of claim 15, further comprising instructions for performing:
generating a new seed value for the instrument upon completing generation of the instance of the PIN; and
updating the new seed value in the account record for use in generating another PIN in response to another request to generate a PIN.

18. The computer program product of claim 15, wherein generating the instance of a PIN further comprises:
receiving purse information from the holder of the instrument, the purse information including an identification of a location on the instrument to which the data value will be transferred; and
encrypting the purse information along with the instrument identifier, the data value, the transfer system key, and the seed value to form the instance of the PIN.

19. The computer program product of claim 15, further comprising instructions for re-synchronizing the seed value used by the transfer system and the PIN generator when the seed value used in the encrypting differs from a seed value retrieved by the transfer system.

20. The computer program product of claim 15, wherein generating the instance of a PIN further includes obtaining authorization to debit or charge an account for the amount of a value, used as the data value to be transferred to the instrument, prior to generating the PIN.

* * * * *